UNITED STATES PATENT OFFICE.

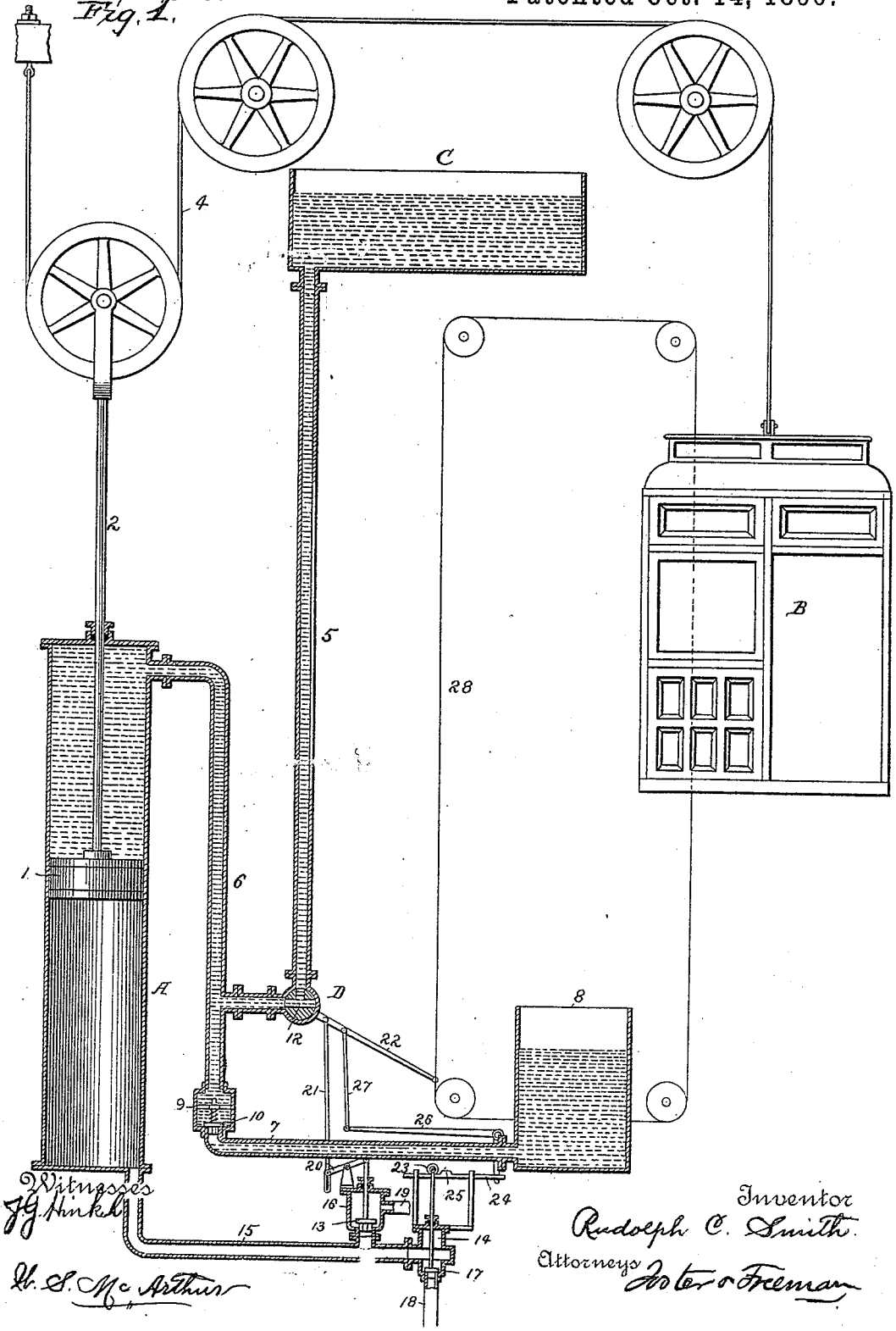

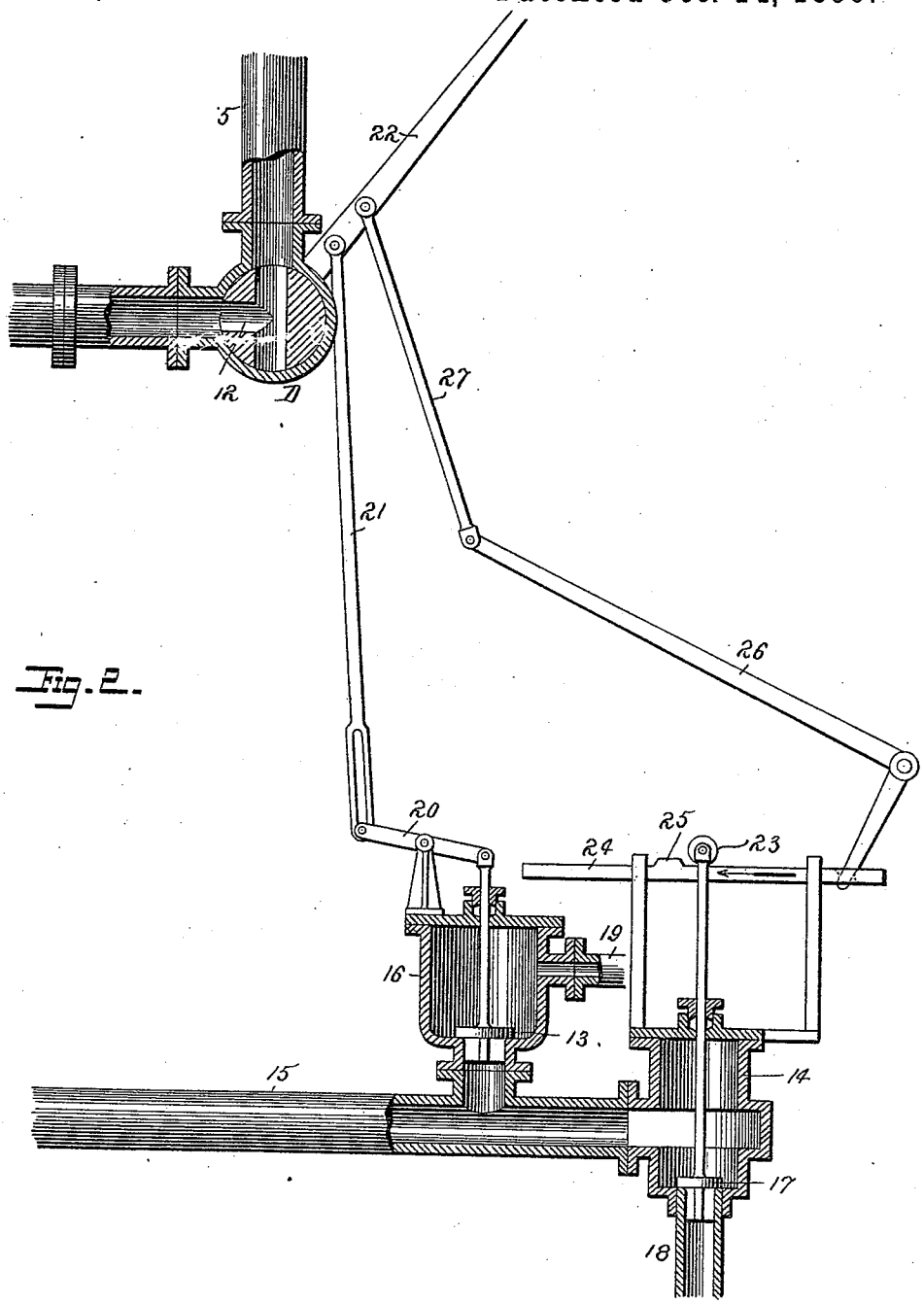

RUDOLPH C. SMITH, OF YONKERS, ASSIGNOR TO THE OTIS BROTHERS & COMPANY, OF NEW YORK, N. Y.

ELEVATOR.

SPECIFICATION forming part of Letters Patent No. 438,388, dated October 14, 1890.

Application filed November 6, 1889. Serial No. 329,417. (No model.)

*To all whom it may concern:*

Be it known that I, RUDOLPH C. SMITH, a citizen of the United States, residing at Yonkers, in the county of Westchester and State of New York, have invented certain new and useful Improvements in Elevators, of which the following is a specification.

My invention relates to elevators; and it consists of an elevating-engine in which steam and water are supplied independently to the opposite ends of the cylinder and are regulated by valve devices, as described hereinafter, whereby the water will act upon one side of the piston under hydrostatic pressure to lift the cage while the steam will coact with the weight of the cage in descending to lift the piston and restore the water to its elevated reservoir, thereby avoiding the necessity of continually adding to the supply of motor-fluid.

In the accompanying drawings, Figure 1 is a sectional elevation of a combined water and steam elevator illustrating my invention. Fig. 2 is an enlarged view illustrating the valve devices and connections in a different position from that shown in Fig. 1.

The cylinder A, which may be vertical or horizontal, is shown as a vertical cylinder provided with a piston 1, connected to a piston-rod 2, carrying the usual pulley, around which and around guide-pulleys passes the usual cable 4, connected to the cage B. The motor-liquid water is taken from an elevated tank C or other source of supply, and is conducted from the tank through a pipe 5, extending to a valve device D, communicating at the lower end with a pipe 6, that leads to the upper end of the cylinder A, and with the lower end of the pipe 6 communicates a pipe 7, extending to a supplemental tank 8. In a casing 9, at the junction of the pipes 6 and 7, is a check-valve 10, opening upward, and the valve device D is provided with one or more valves 12, suitably constructed to open or close the fluid-connection between the pipes 5 and 6, according to the position of the valve.

With the lower end of the cylinder A communicates a pipe 15, leading to a casing 14, containing a valve 17, closing a port leading to an exhaust-pipe 18, and with the pipe 15 communicates a valve-casing 16, containing a valve 13, and communicating with a steam-pipe 19. The stem of the valve 13 is connected to a lever 20, provided with a pin passing into a slot in a rod 21, connected to a lever 22, attached to the valve 12. The stem of the valve 17 is provided with a roller-bearing 23, resting upon a slide 24, having a lug 25, and a bell-crank lever 26 is connected with the slide 24, and through the medium of the rod 27 with the lever 22. A shifting-rope 28 is connected to the lever 22, and passes around guide-pulleys and through the cage B, so that the valve 12 may be shifted from the cage by operating said rope. Any other well-known valve-shifting device may be substituted for the rope.

When the cage is to be elevated, the lever 22 of the valve device D is shifted to the position shown in Fig. 2, whereby the valves 13 and 17 are closed and the valve 12 opened to permit the motor-fluid to pass into the top of the cylinder A and press upon the piston 1, the descent of which elevates the cage. If the piston should be moving rapidly when the valve 12 is closed, in order to arrest the motion of the cage the momentum of the piston will cause the valve 10 to be temporarily lifted, supplying a small amount of water to the pipe 6 and preventing the temporary vacuum which would otherwise occur, the valve 10 closing and locking the piston against upward movement after its motion is arrested.

To avoid the waste of the motor-fluid, and therefore to avoid the necessity of constantly pumping additional supplies of fluid into the tank C, I provide for forcing the fluid after it has acted upon the piston to depress the same back into the tank by the application of pressure to the lower side of the piston, which pressure coacts with the weight of the cage when the latter descends, so that it is only necessary to supplement the weight of the cage to the extent necessary to overcome the weight of the column of water leading to the tank. This I effect through the medium of the devices above described, or of any equivalent devices whereby steam is admitted to the lower part of the cylinder A when the piston 1 is to be raised. Thus, after the piston 1 has descended the required extent, if the valve 12 may be shifted to the position shown in Fig. 1 the valve 13 will be raised and steam will pass through the pipe 15 into the cylinder A and will lift the piston thereof in connection with the weight of the cage B, forcing the water back into the tank C. As the valve 12 is shifted from the position shown in Fig. 1 to the position shown in Fig. 2, when it is desired to again elevate the cage the valve 13 will be brought to its seat, while the slide 24 will be moved in the direction of the arrow, Fig. 2, and the lug 25 will raise the valve 17 for an instant to open the passage from the lower part of the cylinder A to the exhaust, thereby relieving the cylinder from pressure below the piston, after which the valve 17 will take its seat, closing the space below the cylinder A. The leakage of water around the piston, as well as the radiation of heat from the sides of the cylinder A, will speedily condense what steam remains in the lower part of the cylinder, causing a rarefaction and tendency to a vacuum, which materially aids in the descent of the piston and gives increased lifting capacity to the mechanism.

It will be evident that various forms of valve devices may be substituted for the valve devices D and E for regulating the flow of steam and water to and from the cylinder, and it will also be evident that this invention may be employed in connection with any suitable liquids or fluids, either incompressible or elastic, for the return of the motor-fluid to the storage tank or reservoir, avoiding the necessity of constantly renewing the supply.

Without limiting myself to the construction and arrangement of parts shown, I claim—

1. The combination, with the cylinder, piston, elevated water-reservoir supplying water under pressure, and supply-pipes of an elevator, of a pipe communicating with a steam-generator and supplying steam to the opposite side of the piston, and a valve device constructed to open communication between the cylinder and water-reservoir and also to admit the steam against the piston on the descent of the cage, substantially as described.

2. The combination of a cylinder, piston connected with an elevator-cage, and pipes connected with opposite ends of the cylinder and leading to a reservoir from which water is supplied under pressure and to a steam-generator, and valve devices in said pipes connected to open one pipe and close the other when the cage is to be raised, and to open both when the cage is to descend, whereby the water is restored to its elevated reservoir by the joint action of the steam and the weight of the cage, substantially as described.

3. The combination of the cylinder, piston, cage, elevated water-supply tank, pipe and valve device, and steam-supply pipe and valve device, the pipes communicating with opposite ends of the cylinder and the two valve devices connected to close the steam-pipe and open the water-pipe when the cage is to rise, and to open both pipes when the cage is to descend, substantially as described.

4. The combination of the cylinder, piston, cage, water-supply pipe, and water-valve device, and steam-supply-pipe valve device, having steam and exhaust ports and valve, the steam and water pipes communicating with opposite ends of the cylinder, and operating devices connected with both valves to first open and then close the exhaust prior to opening the steam-port, substantially as described.

5. The combination, with the cylinder and its piston, of a pipe communicating at one end and with water under pressure, a pipe communicating with the other end and with a steam-generator and with an exhaust-pipe, valve regulating the flow of steam, and a valve closing the exhaust, and connections between the same and the other valves, whereby the exhaust is opened momentarily as the steam-valve is closed, substantially as set forth.

In testimony whereof I have signed my name to this specification in the presence of two subscribing witnesses.

RUDOLPH C. SMITH.

Witnesses:
EDWD. K. ANDERTON,
E. M. TAYLOR.